United States Patent
Tsuchiya et al.

(10) Patent No.: US 7,466,380 B2
(45) Date of Patent: *Dec. 16, 2008

(54) LIQUID CRYSTAL DISPLAY AND ELECTRONIC APPARATUS

(75) Inventors: Hitoshi Tsuchiya, Suwa (JP); Nobutaka Urano, Chino (JP)

(73) Assignee: Seiko Epson Corporation (JP)

( * ) Notice: Subject to any disclaimer, the term of this patent is extended or adjusted under 35 U.S.C. 154(b) by 161 days.

This patent is subject to a terminal disclaimer.

(21) Appl. No.: 11/468,076

(22) Filed: Aug. 29, 2006

(65) Prior Publication Data

US 2006/0285035 A1    Dec. 21, 2006

Related U.S. Application Data

(62) Division of application No. 10/400,168, filed on Mar. 26, 2003, now Pat. No. 7,119,861.

(30) Foreign Application Priority Data

Mar. 26, 2002 (JP) .............................. 2002-085930

(51) Int. Cl.
*G02F 1/1335* (2006.01)
(52) U.S. Cl. ...................................... 349/114; 349/108
(58) Field of Classification Search ......... 349/106–109, 349/113–114
See application file for complete search history.

(56) References Cited

U.S. PATENT DOCUMENTS

| | | | |
|---|---|---|---|
| 6,195,140 B1 | 2/2001 | Kubo et al. | |
| 6,476,889 B2 | 11/2002 | Urabe et al. | 349/106 |
| 6,580,480 B2 | 6/2003 | Baek et al. | 349/114 |
| 6,757,038 B2 | 6/2004 | Itoh et al. | 349/114 |
| 6,831,721 B2 | 12/2004 | Maeda et al. | 349/117 |
| 7,119,861 B2 * | 10/2006 | Tsuchiya et al. | 349/108 |
| 7,298,439 B2 * | 11/2007 | Ozawa et al. | 349/114 |
| 2003/0076463 A1 | 4/2003 | Ozawa et al. | 349/113 |

(Continued)

FOREIGN PATENT DOCUMENTS

JP    11-44814    2/1999

(Continued)

*Primary Examiner*—Dung T. Nguyen
(74) *Attorney, Agent, or Firm*—Harness, Dickey & Pierce, P.L.C.

(57) ABSTRACT

A structure of a multi-gap liquid crystal display is provided in which high-quality images can be displayed even when the orientation of the crystal molecules is disordered in the border regions between a transmissive display region and a reflective display region and between adjacent pixel regions that can be easily manufactured at low cost. The liquid crystal display has a first substrate, a second substrate, and a liquid crystal layer. A light-reflecting layer for defining a reflective display region and a transmissive display region is formed in a pixel region. A thickness-adjusting layer having a recess corresponding to the transmissive display region inside an opening is formed above the light-reflecting layer. A color filter overlap is formed at the border region between the reflective display region and the transmissive display region. The color filter overlap is either in direct contact with or distant from the thickness-adjusting layer. The color filter overlap is also formed at the border region between the adjacent pixel regions and is either in direct contact with or distant from the thickness-adjusting layer.

17 Claims, 9 Drawing Sheets

U.S. PATENT DOCUMENTS

2003/0231267 A1 * 12/2003 Murai et al. ................. 349/113
2004/0165130 A1    8/2004 Ozawa et al. ................. 349/114

FOREIGN PATENT DOCUMENTS

| | | |
|---|---|---|
| JP | 2955277 | 7/1999 |
| JP | 11-242226 | 9/1999 |
| JP | 11-305248 | 11/1999 |
| JP | 11-316382 | 11/1999 |
| JP | 2000-180881 | 6/2000 |
| JP | 2000-187210 | 7/2000 |
| JP | 2000-267081 | 9/2000 |
| JP | 2000-275660 | 10/2000 |
| JP | 2000-298271 | 10/2000 |
| JP | 2000-305099 | 11/2000 |
| JP | 2000-305110 | 11/2000 |
| JP | 2001-166289 | 6/2001 |
| JP | 2001-221995 | 8/2001 |
| JP | 2001-281648 | 10/2001 |
| JP | 2001-318377 | 11/2001 |
| JP | 2003-177410 | 6/2003 |
| JP | 2003-287745 | 10/2003 |
| KR | 2002-0005079 | 1/2002 |

* cited by examiner (A)

(B)

(C)

(D)

(A)

(B)

(C)

(B)

(C)

(D)

(A)

(B)

(C)

(D)

US 7,466,380 B2

LIQUID CRYSTAL DISPLAY AND ELECTRONIC APPARATUS

CROSS-REFERENCE TO RELATED APPLICATIONS

This application is a divisional of U.S. patent application Ser. No. 10/400,168 filed on Mar. 26, 2003. This application claims the benefit of Japanese Patent Application No. 2002-085930 filed Mar. 26, 2002. The disclosures of the above applications are incorporated herein by reference.

TECHNICAL FIELD OF THE INVENTION

The present invention relates to liquid crystal displays and more particularly to a transflective liquid crystal display. More particularly, the present invention is directed to a multi-gap-type liquid crystal display in which the thickness of the liquid crystal layer in a transmissive display region and the thickness of the liquid crystal layer in a reflective display region are changed to achieve optimum thickness inside each pixel.

DESCRIPTION OF THE RELATED ART

Among various types of liquid crystal displays, transflective liquid crystal displays, which are capable of displaying images in both a transmissive mode and a reflective mode, are used in various situations.

FIGS. 9(A) and (B) and FIGS. 10(C) and (D) are, respectively, a cross-sectional view of a conventional liquid crystal display, a plan view schematically showing one of a plurality of pixel regions arranged in a matrix in the liquid crystal display, a cross-sectional view taken along line A-A', and a cross-sectional view taken along line B-B'.

As shown in FIGS. 9(A) and (B) and FIGS. 10(C) and (D), this transflective liquid crystal display includes a first substrate 10, a second substrate 20, and a liquid crystal layer 5 of a twisted nematic (TN) type disposed between the first substrate 10 and the second substrate 20. The first substrate 10 is provided with a first transparent electrode 11, and the second substrate 20 is provided with a second transparent electrode 21 on the face opposing the first transparent electrode 11. On the first substrate 10, a light-reflecting layer 4 constituting a reflective display region 31 is formed inside a pixel region 3 where the first transparent electrode 11 opposes the second transparent electrode 21. The remaining region, in which no light-reflecting layer 4 is formed, is a transmissive display region 32. A color filter 81 for reflective display and a color filter 82 for transmissive display are respectively formed in the reflective display region 31 and the transmissive display region 32 on the light-reflecting layer 4. The first transparent electrode 11 and an alignment film 13 are also formed on the light-reflecting layer 4 with an overcoat layer 12 therebetween. The second transparent electrode 21 is formed on the second substrate 20, and an alignment film 22 is formed on the second transparent electrode 21. A polarizer 41 is disposed on the outer face of the first substrate 10, and a polarizer 42 is disposed on the outer face of the second substrate 20. A backlight unit 7 opposes the polarizer 41.

In the liquid crystal display having the above-described structure, of light emitted from the backlight unit 7, light entering the transmissive display region 32 enters the liquid crystal layer 5 from the first-substrate 10 side, is modulated in the liquid crystal layer 5, and is emitted from the second substrate 20 as transmissive display light to display images (transmissive mode), as shown by an arrow L1.

Of the external light entering from the second-substrate 20 side, light entering the reflective display region 31 reaches the light-reflecting layer 4 through the liquid crystal layer 5, is reflected at the light-reflecting layer 4, and is emitted from the second substrate 20 through the liquid crystal layer 5 as reflective display light to display images (reflective mode), as shown by an arrow L2.

During the light modulation, when the twist angle of the liquid crystal is small, the change in polarization state is represented by a function of the refractive index difference $\Delta n$ and the thickness d of the liquid crystal layer 5 (retardation $\Delta n \cdot d$). Displays with high visibility can be achieved by optimizing this value. However, in the transflective liquid crystal display, the transmissive display light passes through the liquid crystal layer 5 only once before emission, whereas the reflective display light passes through the liquid crystal layer 5 twice. Thus, it is difficult to optimize the retardation $\Delta n \cdot d$ for both the transmissive display light and the reflective display light. If the thickness d of the liquid crystal layer 5 is adjusted to improve the visibility in the reflective mode display, the transmissive mode display is degraded. In contrast, if the thickness d of the liquid crystal layer 5 is adjusted to improve the visibility in the transmissive mode display, the reflective mode display is degraded.

Japanese Unexamined Patent Application Publication No. 11-242226 teaches a structure in which the thickness d of the liquid crystal layer in the reflective display region 31 is adjusted to be smaller than the thickness d of the liquid crystal layer 5 in the transmissive display region 32. Such a structure is called "multi-gap type" structure. For example, as shown in FIG. 11, a thickness-adjusting layer 6 having a recess corresponding to the transmissive display region 32 is formed under the first transparent electrode 11 and above light-reflecting layer 4 to achieve this structure. In particular, because the thickness d of the liquid crystal layer 5 in the transmissive display region 32 is larger than that in the reflective display region 31, by an amount equal to the thickness of the thickness-adjusting layer 6, optimization of $\Delta n \cdot d$ of both the transmissive display light and the reflective display light is possible. In order to adjust the thickness d of the liquid crystal layer 5 using the thickness-adjusting layer 6, the thickness of the thickness-adjusting layer 6 must be sufficiently thick. Such a thick layer may be formed using a photosensitive resin, for example.

The thickness-adjusting layer 6 composed of a photosensitive resin is formed by photolithography. However, during photolithography, a slope 60 is formed in the thickness-adjusting layer 6 at the border between the reflective display region 31 and the transmissive display region 32 due to the limitation of exposure accuracy, side etching during development, or the like. Since the thickness d of the liquid crystal layer 5 gradually changes at the border between the reflective display region 31 and the transmissive display region 32, the retardation $\Delta n \cdot d$ also changes gradually at the border. Although the initial orientation of the liquid crystal molecules in the liquid crystal layer 5 is regulated by the alignment films 13 and 22 provided at the inner faces of the first substrate 10 and the second substrate 20, respectively, the force of the alignment film 13 that controls the orientation works in a diagonal direction at the slope 60. Thus, the orientation of the liquid crystal molecules becomes disordered at this region. Even if no slopes are formed and a stepped portion is provided which is perpendicular to the substrate, the orientation of the liquid crystal molecules at the border may still be disordered.

In a known liquid crystal display of, for example, a normally-black type, the entire display area should appear black if no electric field is applied. However, because light leaks from the portion corresponding to the slope 60, the contrast is degraded and display failure occurs.

Moreover, the orientation of the liquid crystal molecules becomes disordered at the borders between adjacent pixel regions due to the difference in polarity of the transparent electrodes, thereby allowing light to leak from this region. Conventionally, a light-shielding layer composed of metal, resin, or the like is provided in this region of the liquid crystal display; however, a separate step for forming such a light-shielding layer is necessary, thereby increasing manufacturing costs.

To overcome these problems, the present invention aims to provide a multi-gap type liquid crystal display in which the thickness of the liquid crystal layer in a transmissive display region and the thickness of the liquid crystal layer in a reflective display region are changed to achieve optimum thicknesses inside each pixel region and an electronic apparatus incorporating the liquid crystal display that can display high quality images even when the retardation at the border between the transmissive display region and the reflective display region is inadequate or when the orientation of the liquid crystal molecules at the border is disordered. Moreover, even when the orientation of the liquid crystal molecules is disordered at the border between the adjacent pixel regions, high-quality images can be displayed at low costs without requiring the formation of light-shielding layers of metal, resin, or the like.

SUMMARY

To overcome these problems, the present invention provides a liquid crystal display including first substrates provided with first transparent electrodes, second substrates provided with second transparent electrodes opposing the first transparent electrodes, and liquid crystal layers held between the first substrates and the second substrates; wherein light reflecting layers, thickness adjusting layers, and the first transparent electrodes are stacked on the first substrates in that order. The light reflecting layers form reflective display regions in part of the pixel regions where the first transparent electrodes oppose the second transparent electrodes, and the remainder of the pixel regions are transmissive display regions. Thickness-adjusting layers for adjusting the thickness of the liquid crystal layers at the reflective display regions so that they are smaller than the liquid crystal layers at the transmissive display regions are also included. Color filters for reflective display are formed in the reflective display regions and color filters for transmissive display are formed in the transmissive display regions. The color filters for reflective display and the color filters for transmissive display overlap at least at part of the border regions between the reflective display regions and the transmissive display regions and at least at part of border regions between adjacent pixel regions.

In the present invention, a color filter for reflective display and a color filter for transmissive display overlap at the border regions between the reflective display region and the transmissive display region and between the adjacent electrodes. For example, red, green, and blue filters of the color filter for transmissive display overlap with a blue filter of the reflective color filter. Accordingly, the stacked color filters can absorb light so as to function as a light-shielding layer even when the thickness of the thickness adjusting layer is gradually changed at the border region between the reflective display region and the transmissive display region and the retardation $\Delta n \cdot d$ is gradually changed in this border region or even when the orientation of the liquid crystal molecules is disordered.

Furthermore, the reflective display light and the transmissive display light can be prevented from leaking from the border region between the adjacent pixel regions even when the orientation of the liquid crystal molecules is disordered due to the difference in polarity of the transparent electrodes. Moreover, the problem of light leakage during black display can be avoided, and a step for making a light-shielding layer of metal, resin, or the like previously required to prevent the light leakage from the border region between the adjacent pixel regions can be omitted. Thus, a high-quality liquid crystal display can be provided at low cost.

In this structure, the color filter for transmissive display in the transmissive display region has a different property from the color filter for reflective display in the reflective display region. For example, the color filter for transmissive display can have a color intensity higher than that of the color filter for reflective display.

In such a case, the transmissive display light, which passes through the color filter only once, can be colored as intensely as the reflective display light that passes through the color filter twice. Accordingly, the difference in the color intensity between the transmissive display and the reflective display is small, and high-quality color images can be displayed.

In the present invention, the color filter for reflective display and the color filter for transmissive display can be formed at either one of the first substrate or the second substrate.

In the present invention, the thickness-adjusting layer has a slope in the border region between the reflective display region and the transmissive display region.

In the present invention, the overlap of the color filter for reflective display and the color filter for transmissive display is arranged to overlap with the slope of the thickness-adjusting layer and with the border region between the adjacent pixel regions. The overlap is either in direct contact with the slope of the thickness-adjusting layer or is distant from the slope of the thickness-adjusting layer. Here, the phrase "the overlap is in direct contact with the slope of the thickness-adjusting layer" means that the overlap of the color filters is disposed on the substrate provided with the thickness-adjusting layer, and part of the overlap is embedded in the thickness-adjusting layer. Also, the phrase "the overlap is distant from the slope of the thickness-adjusting layer" means that the overlap is formed on the substrate which is not the substrate provided with the thickness-adjusting layer, and the overlap does not come into direct contact with the thickness-adjusting layer.

In this invention, the transmissive display region is arranged, for example, at the center of the pixel region. Here, the phrase "the center of the pixel region" means that the edges of the transmissive region do not overlap with the edges of the pixel region.

In this invention, the pixel region may be formed as a rectangular region, and the transmissive display region may be rectangular and may have at least one side overlapping at least one side of the pixel region.

As the region where the color filter overlaps are formed becomes large, the display tends to be dark since the amount of light used for display decreases. However, by making the sides of the transmissive region overlap with the sides of the pixel region, the total length of the border region between the transmissive display region and the reflective display regions can be decreased. Thus, a decrease in the amount of light contributing to display can be kept to a minimum. Moreover, because the overlap between the color filter for reflective display and the color filter for transmissive display are formed in the border region between the adjacent pixel regions and this border region around the transmissive display region does not affect display, the quality of the display is not degraded even when the retardation and the orientation of the liquid crystal molecules are disordered at this region.

Examples of this structure include a structure in which the transmissive display region is arranged to overlap with one side of the pixel region, a structure in which the transmissive display region is arranged to overlap with two sides of the pixel region, and a structure in which the transmissive display region is arranged to overlap with three sides of the pixel region. Any one of these structures can be suitably employed.

The liquid crystal display of the present invention can be used as the display unit of an electronic apparatus such as a cellular phone or a mobile computer.

DETAILED DESCRIPTION

Figure 1:
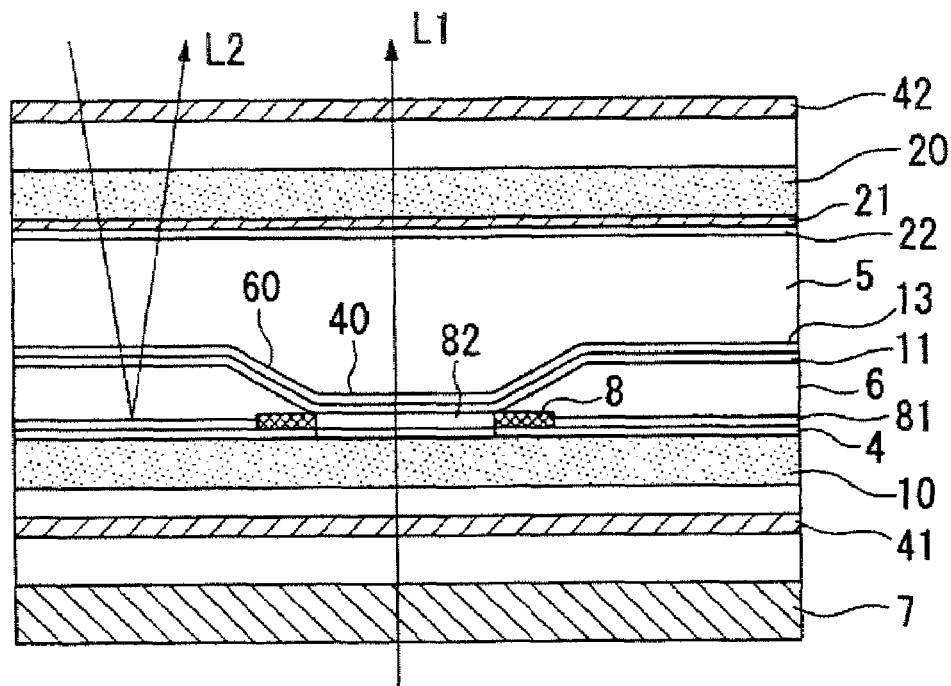
FIGS. 1(A) and (B) are, respectively, a cross-sectional view of a liquid crystal display of one embodiment of the present invention and a plan view schematically showing an arbitrary one or more of a plurality of pixel regions arranged in a matrix in the liquid crystal display.
Figure 1:
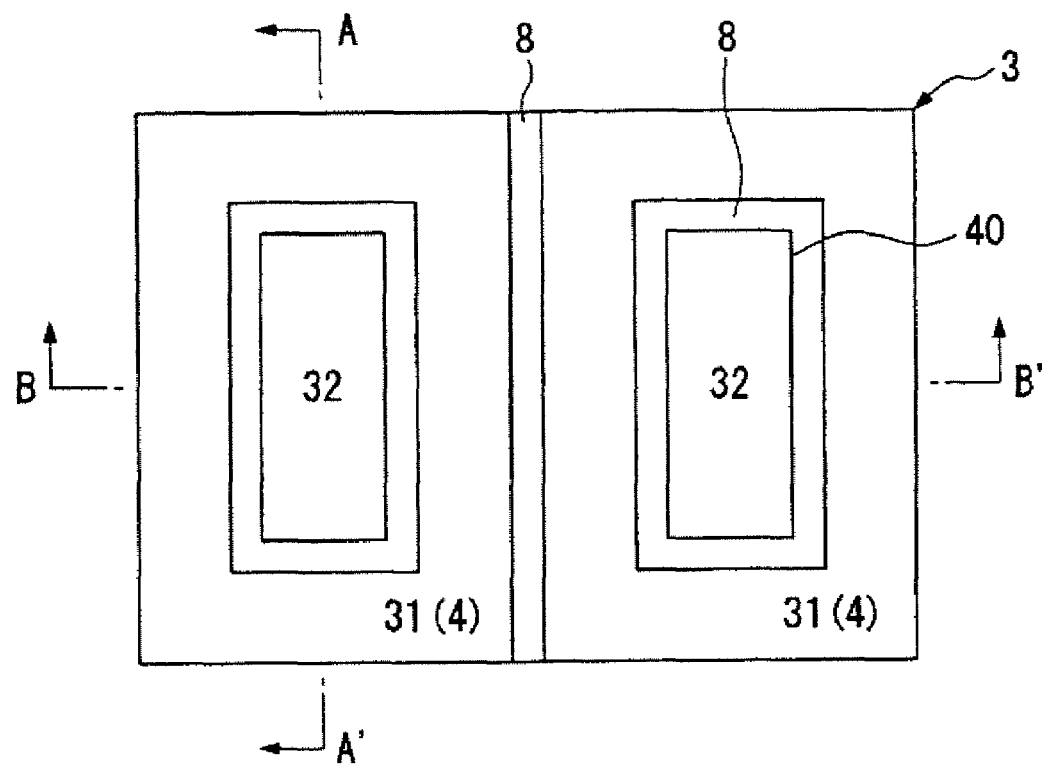

The embodiments of the present invention will now be described with reference to the drawings. In the drawings described below, layers and components are depicted in different scales so that they can be readily recognized in the drawings.

FIRST EMBODIMENT

Figure 11:
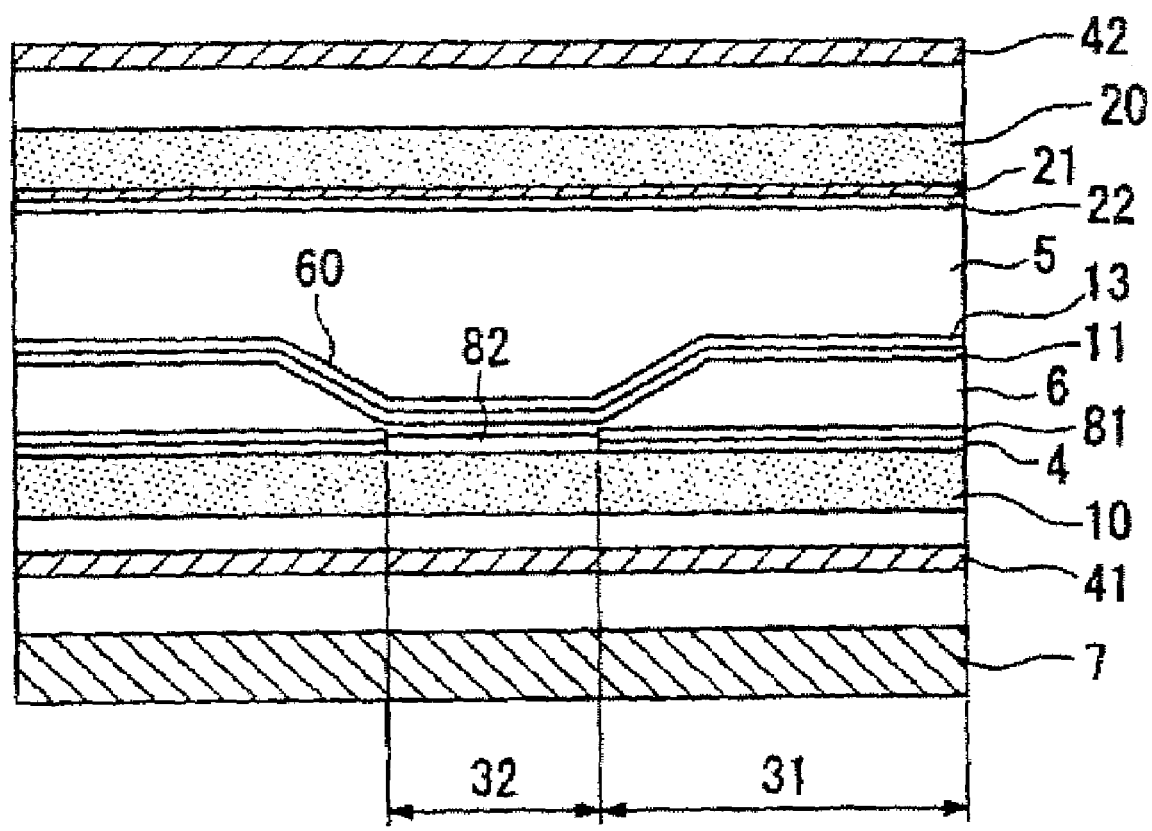
FIG. 11 is a cross-sectional view of a conventional multi-gap liquid crystal display.

FIGS. 1(A) and (B) and FIGS. 2(C) and (D) are, respectively, a cross-sectional view of a liquid crystal display according to one embodiment of the present invention, a plan view schematically showing an arbitrary one or more of a plurality of pixel regions arranged in a matrix in the liquid crystal display, a cross-sectional view taken along line A-A', and a cross-sectional view taken along line B-B'. Since the basic structure of the liquid crystal display of this embodiment is the same as that shown in FIG. 11, the components having the same functions are represented by the same reference numerals.

The pixel region shown in FIG. 1(B), and FIGS. 2(C) and (D) is a partial illustration showing the portion common to active matrix liquid crystal displays employing thin film diodes (TFDs) and thin film transistors (TFTs) as the pixel switching elements. The liquid crystal display shown in the drawings includes a transparent first substrate 10 which is composed of quartz or glass, for example, and provided with a first transparent electrode 11 composed of indium tin oxide (ITO) or the like, a transparent second substrate 20, which is composed of quartz or glass, for example, and provided with a second transparent electrode 21 composed of ITO or the like on the face opposing the first transparent electrode 11, and a liquid crystal layer 5 including a twisted nematic (TN) type liquid crystal held between the first substrate 10 and the second substrate 20. The region sandwiched by the first transparent electrode 11 and the second transparent electrode 21 is a pixel region 3, which directly contributes to display.

A light-reflecting layer 4, which is composed of aluminum or a silver alloy and has a rectangular shape, is formed in the rectangular pixel region 3 at which the first transparent electrode 11 opposes the second transparent electrode 21. The light-reflecting layer 4 constitutes a reflective display region 31. A rectangular opening 40 is formed at the center of the light-reflecting layer 4. With such a structure, the portion of the pixel region 3 provided with the light-reflecting layer 4 constitutes the reflective display region 31; however, the portion inside the rectangular opening 40 is an island-like rectangular transmissive display region 32 where no light-reflecting layer 4 is formed.

A polarizer 41 is formed on the outer face of the first substrate 10 and a polarizer 42 is formed on the outer face of the second substrate 20. A backlight unit 7 opposes the polarizer 41.

In the liquid crystal display having the above-described structure, of light emitted from the backlight unit 7, light entering the transmissive display region 32 enters the liquid crystal layer 5 from the first-substrate 10 side, is modulated in the liquid crystal layer 5, and is emitted from the second-substrate 20 side as transmissive display light to display images (transmissive mode), as shown by an arrow L1.

Of the external light entering from the second-substrate 20 side, light entering the reflective display region 31 reaches the light-reflecting layer 4 via the liquid crystal layer 5, is reflected at the light-reflecting layer 4, and is emitted from the second-substrate 20 side via the liquid crystal layer 5 as the reflective display light to display images (reflective mode), as shown by an arrow L2.

Since a color filter 81 for reflective display and a color filter 82 for transmissive display are respectively formed within the reflective display region 31 and the transmissive display region 32 on the first substrate 10, color images can be displayed. The color intensity of the color filter 82 for the transmissive display is higher than that of the color filter 81 for the reflective display. For example, larger amounts of pigments are used in the color filter 82 for transmissive display.

In this transflective liquid crystal display, whereas the transmissive display light passes through the liquid crystal layer 5 only once before emission, the reflective display light passes through the liquid crystal layer 5 twice. Accordingly, a thickness-adjusting layer 6, which is composed of photosensitive resin such as acrylic resin and has a recess corresponding to the transmissive display region 32 inside the opening 40, is formed over the first substrate 10. Accordingly, the thickness d of the liquid crystal layer 5 at the transmissive display region 32 is larger than that in the reflective display region 31 by an amount equal to the thickness of the thickness-adjusting layer 6. Thus, the retardations Δn·d of both the transmissive display light and the reflective display light can be optimized.

The thickness-adjusting layer 6 may be formed by photolithography, for example. During a photolithographic process, a slope 60 is formed at the border between the reflective display region 31 and the transmissive display region 32 due to the exposure accuracy limitations, side etching during development, or the like. Since the thickness d of the liquid crystal layer 5 gradually changes at the border between the reflective display region 31 and the transmissive display region 32, the retardation Δn·d also changes gradually. Although the initial orientation of the liquid crystal molecules in the liquid crystal layer 5 is regulated by alignment films 13 and 22 provided at the inner faces of the first substrate 10 and the second substrate 20, respectively, the force of the alignment film 13 that controls the orientation works in a diagonal direction at the slopes 60. Thus, the orientation of the liquid crystal molecules becomes disordered at this region.

Moreover, the orientation of the liquid crystal molecules is also disordered at the border between adjacent pixel regions due to the difference in polarity of the transparent electrodes.

The instability at the border regions may degrade the display quality. However, in this embodiment, color filter overlaps 8 are formed in the border region between the reflective display region 31 and the transmissive display region 32 and in the border regions between the adjacent pixel regions. The color filter overlap 8 is formed by stacking the color filter 81 for reflective display and the color filter 82 for transmissive display. For example, the color filter overlap 8 is formed by stacking a red (R) filter, a green (G) filter, and a blue (B) filter of the color filter 82 for transmissive display, and a blue (B) filter of the color filter 81 for reflective display. In this embodiment, a color filter overlap 8 having the shape of a rectangular frame is formed at the inner peripheral region of the light-reflecting layer 4 separating the reflective display region 31 from the transmissive display region 32, and another color filter overlap 8 is formed along the edges of the pixel region 3.

As described above, in this embodiment, the color filter overlaps 8 are formed in the border region between the reflective display region 31 and the transmissive display region 32 and in the border region between the adjacent pixel regions. Accordingly, leakage of the reflective display light and the transmissive display light from the border region between the reflective display region 31 and the transmissive display region 32 can be prevented even when the retardation Δn·d is gradually changed due to the gradual changes in the thickness of the thickness-adjusting layer 6 or even when the orientation of the liquid crystal molecules are disordered. Moreover, leakage of the reflective display light and the transmissive display light from the border regions between the adjacent pixel regions can be prevented even when the liquid crystal molecules have a disordered orientation due to the difference in polarity between the transparent electrodes. Thus, the problem of light leakage during black display can be avoided, and high-quality images can be displayed with high contrast.

Conventionally, light leakage from the border regions between the adjacent pixel regions has been prevented by forming light shielding layers composed of metal, resin, or the like. However, in this embodiment, light shielding layers of metal, resin, or the like are not necessary. Since the step of forming the light shielding layer can be omitted, a liquid crystal display can be manufactured at low costs.

Moreover, because the color intensity of the color filter 82 for the transmissive display is higher than that of the color filter 81 for reflective display, the transmissive display light, which passes through the color filter only once, can be colored as intensely as the reflective display light that passes through the color filter twice. Accordingly, high-quality color images can be displayed.

Note that in this embodiment, four layers, namely, the red filter, the green filter, and the blue filter of the color filter 82 for transmissive display and the blue filter of the color filter 81 for reflective display, are stacked to form the color filter overlap 8 and to obtain sufficient light shielding effects. However, the number and the types of the color filters to be stacked are not limited to these.

In making a liquid crystal display having this structure, the first substrate 10 is prepared as follows.

First, a first substrate 10 composed of quartz or glass, for example, is prepared. A reflective metal layer composed of aluminum, a silver alloy, or the like is formed on the entire face of the first substrate 10. Subsequently, the metallic layer is patterned by a photolithographic process to form the light-reflecting layer 4.

Next, the color filter 81 for reflective display and the color filter 82 for transmissive display are formed in predetermined regions by a flexographic printing method, a photolithographic method, or an inkjet method. During the process, a mask is used to prepare the color filter overlaps 8.

Next, a photosensitive resin is applied on the entire face of the first substrate 10 by a spin-coating method and is exposed and developed to form the thickness-adjusting layer 6.

Next, a transparent conductive layer such as an ITO layer is formed on the entire face of the first substrate 10. The transparent conductive layer is patterned to form the first transparent electrode 11.

Next, a polyimide resin is applied to the entire face of the first substrate 10 by a spin-coating method. The applied polyimide resin is baked and subjected to orientation treatment, such as rubbing, to make the alignment film 13.

The first substrate 10 is then bonded to the second substrate 20 with a predetermined gap therebetween. Liquid crystal is fed into the gap between the substrate to form the liquid crystal layer 5.

In this liquid crystal display, the first substrate 10 may be provided with nonlinear devices for pixel switching such as TFDs and TFTs. Thus, each of the above-described layers can be formed as part of the process for making the TFDs and the TFTs.

SECOND EMBODIMENT

Figure 3:
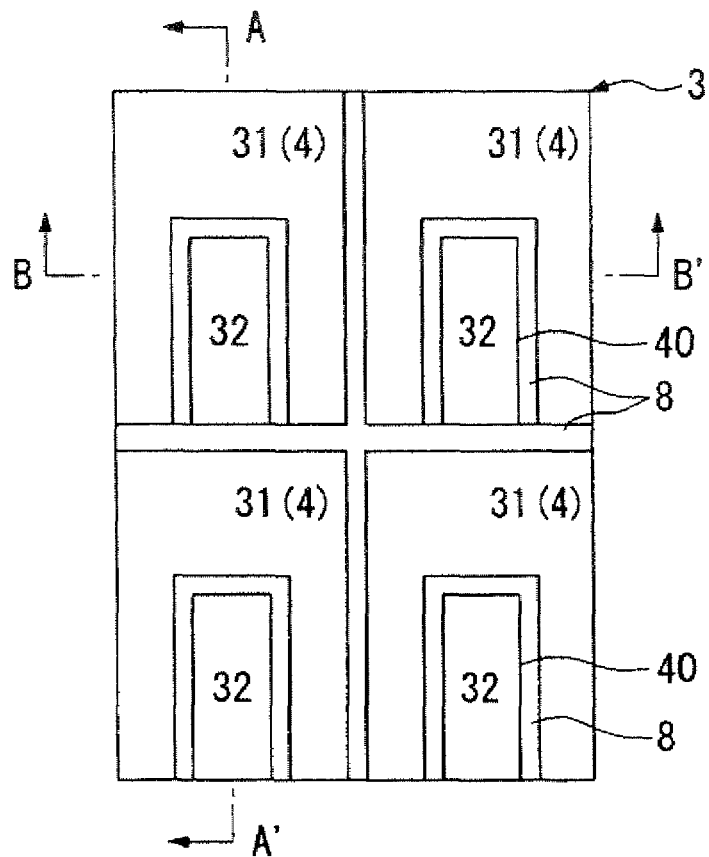
FIGS. 3(A), (B), and (C) show a second embodiment of the present invention and are, respectively, a plan view schematically showing an arbitrary one or more of a plurality of pixel regions arranged in a matrix in a liquid crystal display of this embodiment, a cross-sectional view thereof taken along A-A', and a cross-sectional view thereof taken along B-B'.
Figure 3:
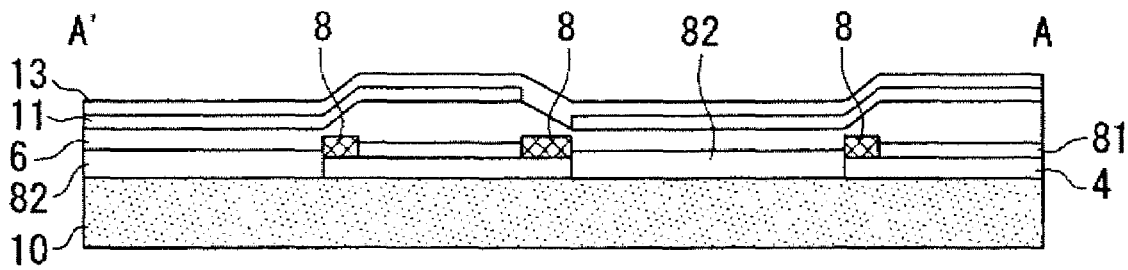
Figure 3:
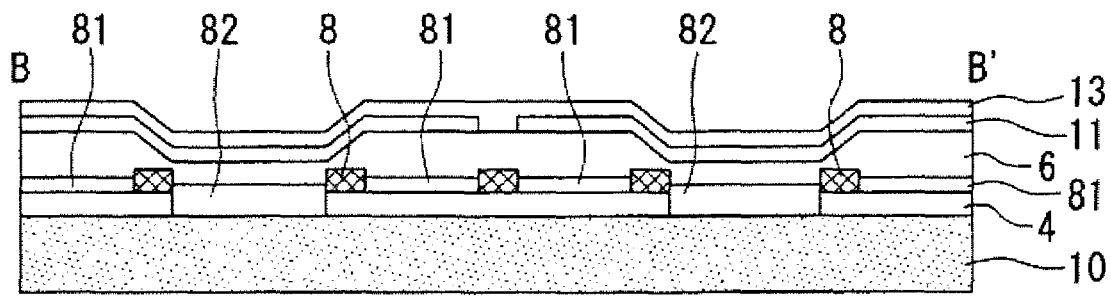

FIGS. 3(A), (B), and (C) are, respectively, a plan view schematically showing an arbitrary one or more of a plurality of pixel regions arranged in a matrix in a liquid crystal display of a second embodiment, a cross-sectional view taken along line A-A', and a cross-sectional view taken along line B-B'. The structure of this embodiment is basically identical to that of the first embodiment. Thus, the components having the same functions are represented by the same reference numerals and explanations thereof are omitted. The method for making the liquid crystal display is also the same as that in the first embodiment, and the explanations thereof are omitted. The cross-section of the liquid crystal display of this embodiment is substantially the same as that of the first embodiment shown in FIG. 1(A) and reference should be made thereto for complete understanding of the following description.

As in the first embodiment, the portion of the pixel region common to active matrix liquid crystal displays using TFDs and TFTs as the nonlinear devices for pixel switching is selectively shown in FIGS. 3(A), (B), and (C). The liquid crystal display shown in these drawings also has a first substrate 10 provided with a first transparent electrode 11, a second substrate 20 provided with a second transparent electrode 21 on the face opposing the first transparent electrode 11, and a liquid crystal layer 5 including a twisted nematic (TN) type liquid crystal disposed between the first transparent electrode 11 and the second transparent electrode 21. The region where the first transparent electrode 11 opposes the second transparent electrode 21 is defined as a pixel region 3, which directly contributes to display.

A light-reflecting layer 4, which is composed of aluminum or a silver alloy and has a rectangular shape, is formed on the first substrate 10 in the rectangular pixel region 3 where the first transparent electrode 11 opposes the second transparent electrode 21. The light-reflecting layer 4 constitutes a reflective display region 31. A rectangular opening 40 is formed in the light-reflecting layer 4 at one side of the light-reflecting layer 4. Thus, the portion of the pixel region 3 provided with the light-reflecting layer 4 constitutes the reflective display region 31, whereas the portion inside the rectangular opening 40 is a rectangular transmissive display region 32 where no light-reflecting layer 4 is formed. Here, one side of the transmissive display region 32 overlaps one side of the pixel region 3.

A polarizer 41 is formed on the outer face of the first substrate 10 and a polarizer 42 is formed on the outer face of the second substrate 20. A backlight unit 7 opposes the polarizer 41. A color filter 81 for reflective display and a color filter 82 for transmissive display are respectively formed within the reflective display region 31 and the transmissive display region 32 at the first substrate 10 so as to display color images.

In this embodiment also, a thickness-adjusting layer 6 composed of a photosensitive resin is formed below the first transparent electrode 11 and above the light-reflecting layer 4 on the first substrate 10. The thickness-adjusting layer 6 has a recess in the region corresponding to the transmissive display region 32 inside the opening 40. Thus, the thickness of the liquid crystal layer 5 at the transmissive display region 32 is larger than the thickness of the liquid crystal layer 5 at the reflective display region 31 by an amount equal to the thickness of the thickness-adjusting layer 6. As a result, the retardations $\Delta n \cdot d$ of both the transmissive display light and the reflective display light are optimized.

At the border region between the reflective display region 31 and the transmissive display region 32, a slope 60 is formed in the thickness-adjusting layer 6. In this embodiment, color filter overlaps 8 are formed at the border region between the reflective display region 31 and the transmissive display region 32 and at the peripheral regions of the pixel region 3. In other words, the color filter overlap 8 formed at the border region between the reflective display region 31 and the transmissive display region 32 has a U-shape in a plan view (which is illustrated upside down in FIG. 3(A)).

In this embodiment, as in the first embodiment, the color filter overlaps 8 are formed at the border regions between the reflective display region 31 and the transmissive display region 32 and the border regions between adjacent pixel regions. Thus, the problem of leakage of light from the border regions between the reflective display region 31 and the transmissive display region 32 and between the adjacent pixel regions during black display can be avoided. That is, this embodiment has the same advantages as the first embodiment.

As the region where the color filter overlaps 8 are formed becomes large, the display tends to be dark since the amount of light used for display decreases. In this embodiment, the color filter overlap 8 at the border region between the reflective display region 31 and the transmissive display region 32 has a U-shape in a plan view, and no color filter overlap 8 is formed at one side of the transmissive display region 32. Since the total length of the color filter overlaps 8 is short, a decrease in the amount of light used for display can be kept to a minimum. Note that the color filter overlap 8 is also formed in the border region between adjacent pixel regions. The periphery of the transmissive display region 32 that overlaps with the border region between the adjacent pixel regions and that is covered with the color filter overlap 8 do not affect the display. Thus, the quality of the display does not decrease even when the retardation is not adjusted in this region or when the orientation of the liquid crystal becomes disordered in this region.

Alternatively, a structure in which two sides of the transmissive display region overlap the sides of the pixel region or a structure in which three sides of the transmissive display region overlap the sides of the pixel region can be employed.

THIRD EMBODIMENT

Figure 4:
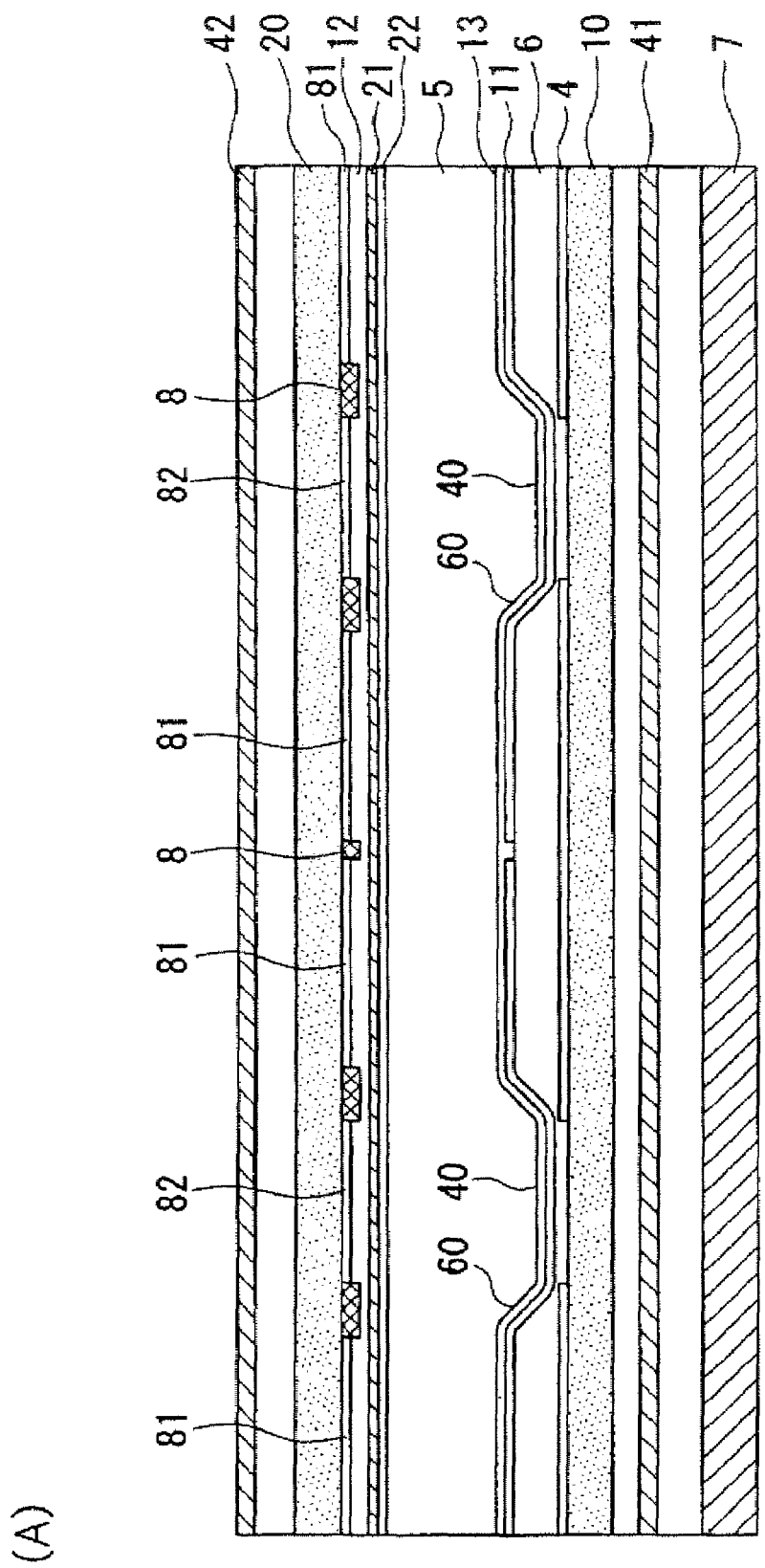
FIG. 4(A) is a cross-sectional view of a liquid crystal display of a third embodiment of the present invention.
Figure 5:
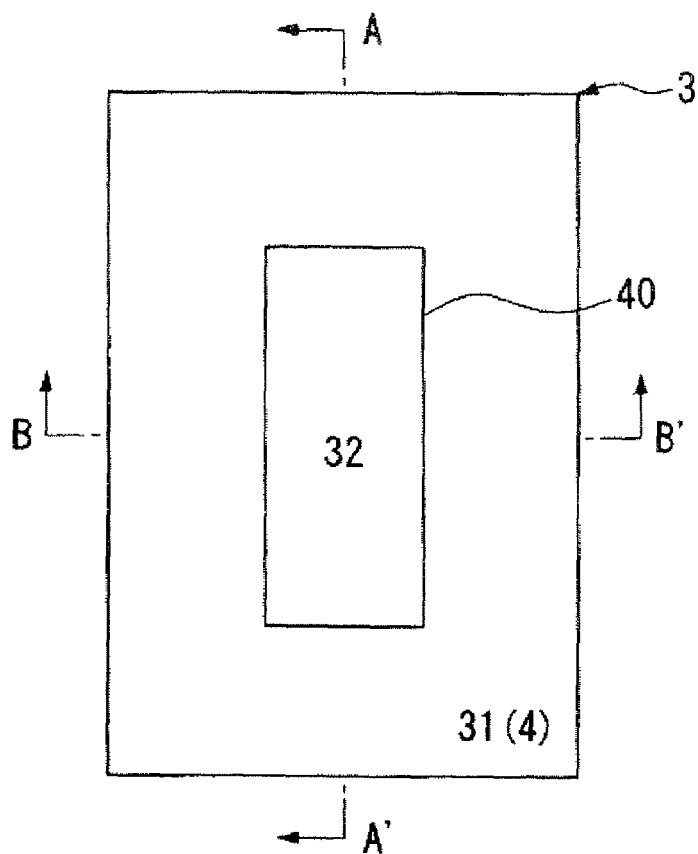
FIGS. 5(B), (C), and (D) are, respectively, a plan view schematically showing an arbitrary one or more of a plurality of pixel regions arranged in a matrix in a liquid crystal display of the third embodiment, a cross-sectional view thereof taken along A-A', and a cross-sectional view thereof taken along B-B'.
Figure 5:
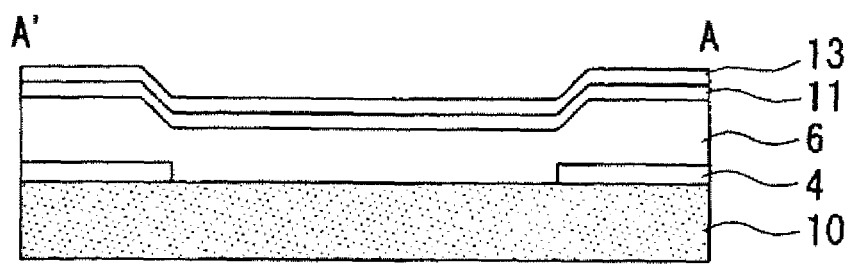
Figure 5:
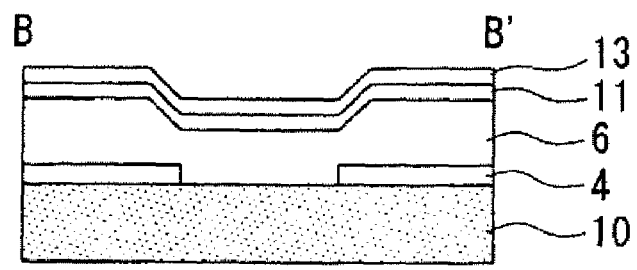

FIG. 4(A), FIGS. 5(B), (C), and (D) are, respectively, a cross-sectional view of a liquid crystal display according to a third embodiment, a plan view schematically showing an arbitrary one or more of a plurality of pixel regions arranged in a matrix in the liquid crystal display, a cross-sectional view taken along line A-A', and a cross-sectional view taken along line B-B'. Since the basic structure of the liquid crystal display of this embodiment is the same as that of the first embodiment, the components having the same functions are represented by the same reference numerals and the description thereof are omitted. The method for making the liquid crystal display is also the same as in the first embodiment, and the description thereof is omitted.

Figure 2:
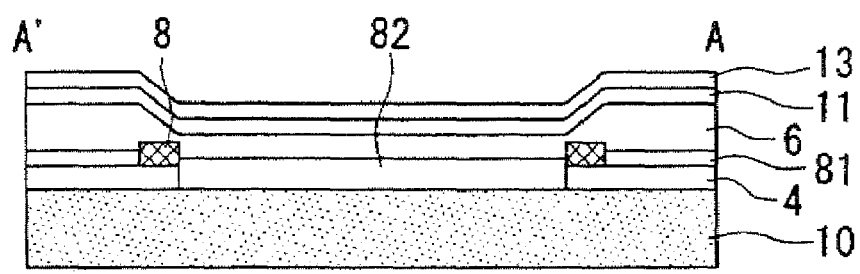
FIGS. 2(C) and (D) are, respectively, a cross-sectional view taken along A-A' of the plan view in FIG. 1(B) and a cross-sectional view taken along B-B' of the plan view in FIG. 1(B).
Figure 2:
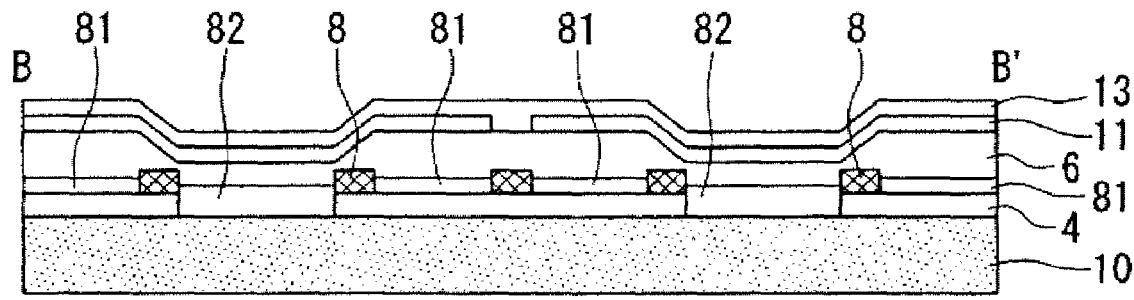

The pixel region shown in FIG. 5(B), FIGS. 2 (C) and (D) is a partial view illustrating the portion common to the active matrix liquid crystal displays employing TFDs and TFTs as the nonlinear devices for pixel switching. The liquid crystal display shown in these drawings also has a first substrate 10 provided with a first transparent electrode 11, a second substrate 20 provided with a second transparent electrode 21 opposing the first transparent electrode 11, and a liquid crystal layer 5 including a twisted nematic (TN) type liquid crystal disposed between the first transparent electrode 11 and the second transparent electrode 21. The region where the first transparent electrode 11 opposes the second transparent electrode 21 is defined as a pixel region 3, which directly contributes to display.

A light-reflecting layer 4, which is composed of aluminum or a silver alloy and has a rectangular shape, is formed in the rectangular pixel region 3 at which the first transparent electrode 11 opposes the second transparent electrode 21. The light-reflecting layer 4 constitutes a reflective display region 31. A rectangular opening 40 is formed at the center of the light-reflecting layer 4. With such a structure, the portion of the pixel region 3 provided with the light-reflecting layer 4 constitutes the reflective display region 31; however, the portion inside the opening 40 is an island-like rectangular transmissive display region 32 where no light-reflecting layer 4 is formed.

A polarizer 41 is formed on the outer face of the first substrate 10 and a polarizer 42 is formed on the outer face of the second substrate 20. A backlight unit 7 opposes the polarizer 41.

In this embodiment, since a color filter 81 for reflective display and a color filter 82 for transmissive display are respectively formed within the reflective display region 31 and the transmissive display region 32 on the first substrate 10, color images can be displayed.

In this embodiment also, a thickness-adjusting layer 6 composed of a photosensitive resin is formed below the first transparent electrode 11 and above the light-reflecting layer 4 on the first substrate 10. The thickness-adjusting layer 6 has a recess in the region corresponding to the transmissive display region 32 inside the opening 40. Thus, the thickness of the liquid crystal layer 5 at the transmissive display region 32 is larger than of the thickness of the liquid crystal layer 5 at the reflective display region 31 by an amount equal to the thickness of the thickness-adjusting layer 6. As a result, the retardations Δn·d of both the transmissive display light and the reflective display light are optimized.

At the border between the reflective display region 31 and the transmissive display region 32, slopes 60 are formed in the thickness-adjusting layer 6. In this embodiment, color filter overlaps 8 are formed in the border region between the reflective display region 31 and the transmissive display region 32 and on the portion of the second substrate 20 opposing the peripheral regions of the pixel region 3.

In this embodiment, the color filter overlaps 8 are formed over the border region between the reflective display region 31 and the transmissive display region 32 and on the portion of the second substrate 20 opposing the border region between adjacent pixel regions. Thus, the problem of leakage of light from the border regions between the reflective display region 31 and the transmissive display region 32 and between the adjacent pixel regions during black display can be avoided. That is, this embodiment has the same advantages as the first and second embodiments.

The scope of the present invention is not limited by the above-described embodiments. Various modifications are possible without departing from the spirit of the present invention. For example, although active matrix liquid crystal displays using TFDs and TFTs as switching elements are used as the examples in the first to third embodiments, the present invention can be applied to passive matrix liquid crystal displays. Although the color filter overlaps are formed in all of the border regions between the reflective display region and the transmissive display region and between the adjacent pixel regions to completely prevent light leakage, a certain degree of benefits can be obtained by forming the color filter overlaps in only part of the border regions.

Application of Liquid Crystal Display to Electronic Apparatus

Liquid crystal displays having the above features can be used as display units of various electronic apparatuses. An example of such applications will now be described with reference to FIGS. 6, 7, and 8.

Figure 6:
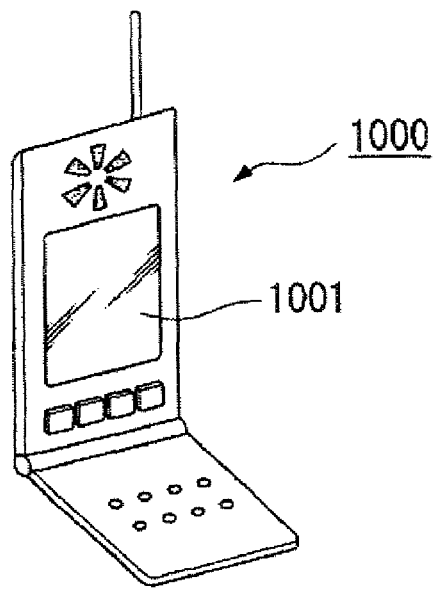
FIG. 6 is an example of an electronic apparatus incorporating the liquid crystal display of the present invention as the display unit.

FIG. 6 is a perspective diagram showing an example of a cellular phone. In FIG. 6, reference numeral 1000 denotes a cellular phone main unit, and reference numeral 1001 denotes a liquid crystal display unit incorporating the liquid crystal display described above.

Figure 7:
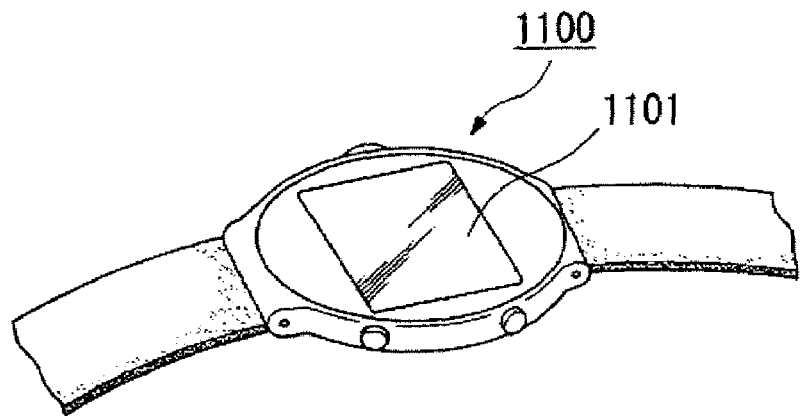
FIG. 7 is another example of an electronic apparatus incorporating the liquid crystal display of the present invention as the display unit.

FIG. 7 is a perspective diagram showing an example of a wristwatch-type electronic apparatus. In FIG. 7, reference numeral 1100 denotes a watch main unit, and reference numeral, 1101 denotes a liquid crystal display unit incorporating the liquid crystal display described above.

Figure 8:
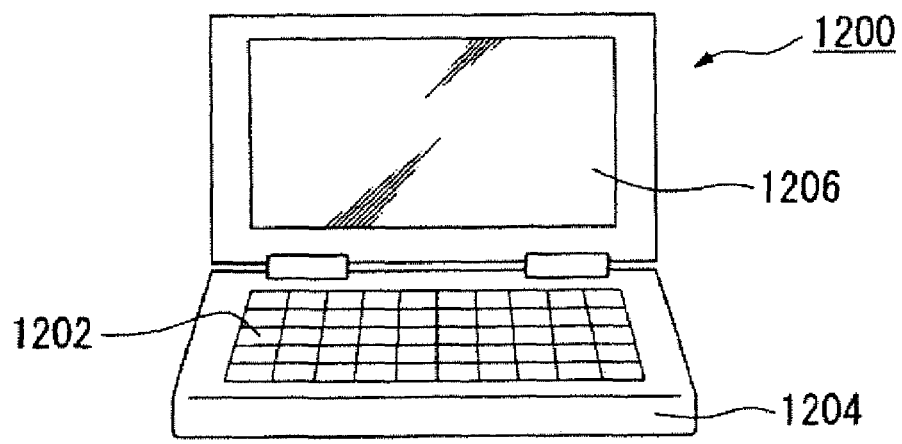
FIG. 8 is yet another example of an electronic apparatus incorporating the liquid crystal display of the present invention as the display unit.
Figure 9:
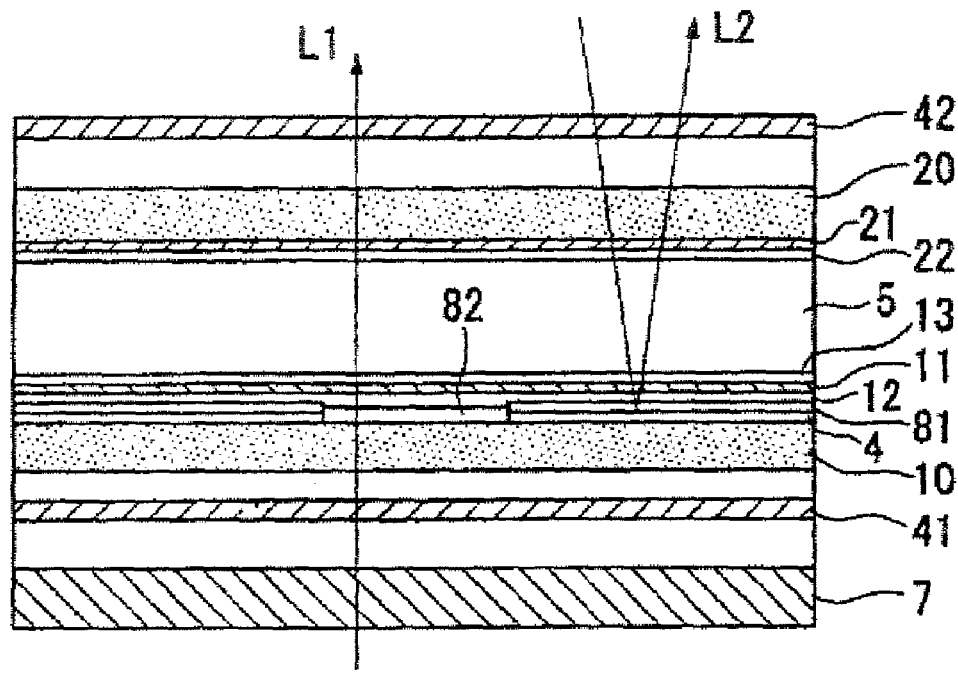
FIGS. 9(A) and (B) are, respectively, a cross-sectional view of a conventional liquid crystal display and a plan view schematically showing an arbitrary one or more of a plurality of pixel regions arranged in a matrix in the liquid crystal display.
Figure 9:
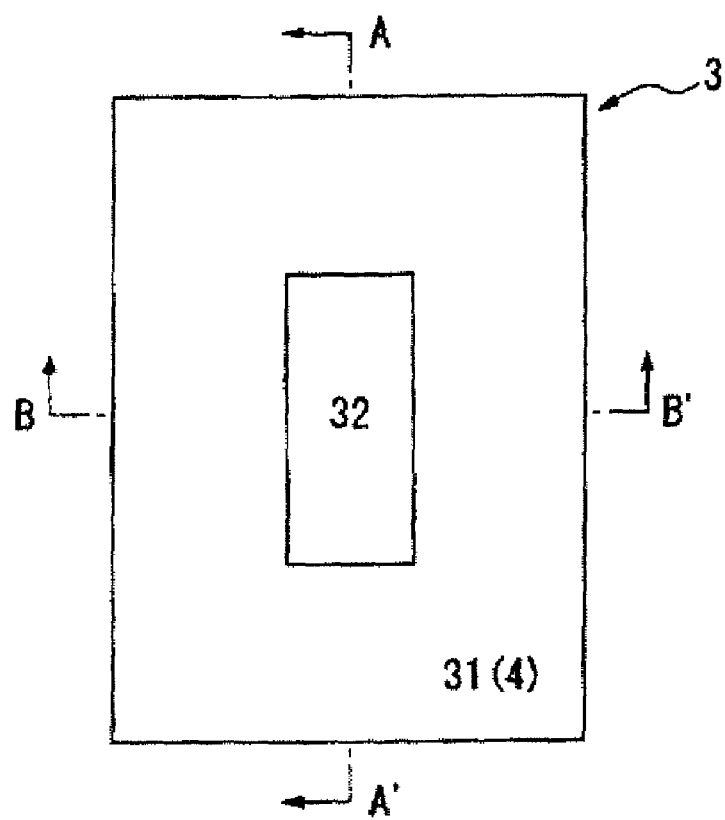
Figure 10:
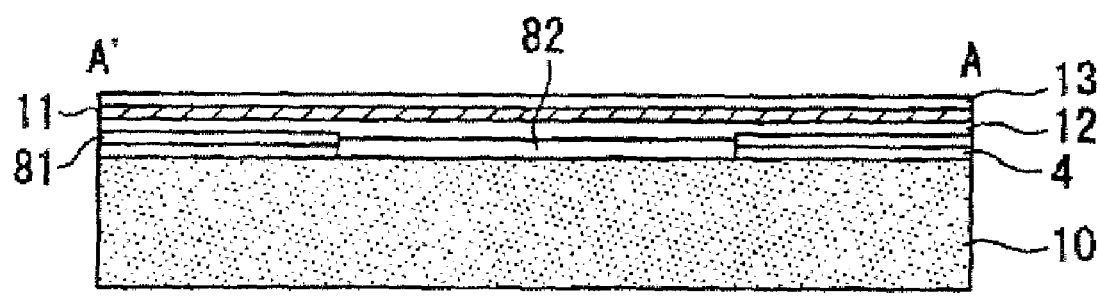
FIGS. 10(C) and (D) are, respectively, a cross-sectional view taken along A-A' of the plan view in FIG. 9(B) and a cross-sectional view taken along B-B' of the plan view in FIG. 9(B).
Figure 10:
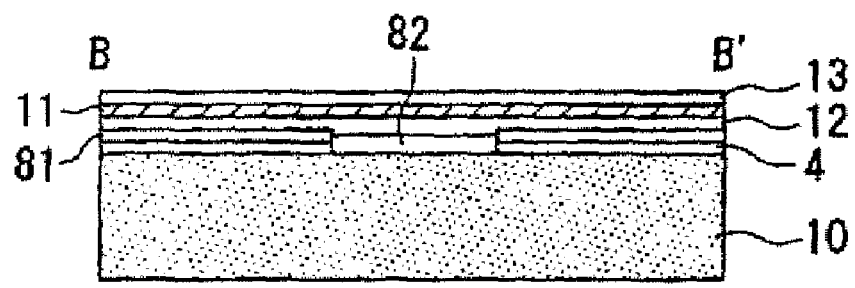

FIG. 8 is a perspective view showing an example of a portable information processing apparatus such as a word processor or a personal computer. In FIG. 8, reference numeral 1200 denotes an information processing device, reference numeral 1202 denotes an input unit such as keyboard, reference numeral 1204 denotes an information processing device main unit, and reference numeral 1206 denotes a liquid crystal display unit incorporating the above-described liquid crystal display.

Since the electronic apparatuses shown in FIGS. 6 to 8 include liquid crystal display units incorporating the liquid crystal display according to the above-described embodiments, electronic apparatuses including liquid crystal display units having high visibility in various operating environment can be achieved.

Advantages

As described above, in the liquid crystal display of the present invention the color filters for the transmissive display and the color filters for the reflective display are stacked at the border regions between the reflective display regions and the transmissive display regions and between the adjacent pixel regions. Thus, even when the thickness of the thickness-adjusting layer is gradually changed and the retardation Δn·d gradually is gradually changed in the border regions between the reflective display regions and the transmissive display regions or even when the orientation of the liquid crystal molecules is disordered, leaking of the reflective display light or the transmissive display light from these regions can be prevented. Thus, the problem of light leakage during black display can be avoided, and high quality images with high contrast can be displayed. Moreover, since the liquid crystal display requires no light shielding layer composed of metal, resin, or the like, which has conventionally been formed to prevent light leakage at the border region between the adjacent pixel regions, the number of steps can be decreased, and liquid crystal displays can be manufactured at low costs.

The entire disclosure of Japanese Patent Application No. 2002-085930 filed Mar. 26, 2002 is incorporated by reference.

What is claimed is:

1. A liquid crystal display comprising:
a first substrate;
a second substrate;
a liquid crystal layer between the first substrate and the second substrate;
pixels regions that selectively and independently apply voltage to the liquid crystal layer, each pixel region including a reflective display region and a transmissive display region;
a light reflecting layer including the reflective display regions of the pixel regions, the light reflecting layer including an aperture;
a thickness-adjusting layer causing the thickness of the liquid crystal layer at the reflective display regions to be smaller than the thickness of the liquid crystal at the transmissive display regions;

color filters for reflective display formed in the reflective display regions; and color filters for transmissive display formed in the transmissive display regions;

wherein the color filters for reflective display and the color filters for transmissive display overlap.

2. The display according to claim 1, wherein the color filters for transmissive display have a higher color intensity than the color filters for reflective display.

3. The display according to claim 1, wherein the overlap of the color filters for reflective display and the color filters for transmissive display frames the transmissive display region.

4. The display according to claim 3, wherein the overlap is aligned with a slope corresponding to a border between the reflective display region and the transmissive display region.

5. The display according to claim 1, wherein the thickness-adjusting layer is formed on the color filters for reflective display and the color filters for transmissive display.

6. The display according to claim 1, wherein each pixel region is rectangular.

7. The display according to claim 1, wherein the color filters for reflective display and the color filters for transmissive display are formed on a first substrate side of the liquid crystal layer.

8. The display according to claim 1, wherein the color filters for reflective display and the color filters for transmissive display are formed on a second substrate side of the liquid crystal layer.

9. An electronic apparatus including the liquid crystal display according to claim 1.

10. The display according to claim 1, wherein the overlap is formed by stacking a red filter, a green filter, and a blue filter of the color filter for transmissive display with a blue filter of the color filter for reflective display.

11. The display according to claim 1, the thickness-adjusting layer including a slope at a border between the reflective display region and the transmissive display region of each pixel region, the color filters for reflective display and the color filters for transmissive display overlap at least at part of the slope of the thickness-adjusting layer between the reflective display regions and the transmissive display regions.

12. The display according to claim 1, the thickness-adjusting layer, the color filters for reflective display, and the color filters for transmissive display being disposed between the liquid crystal layer and the same one of the first and second substrates.

13. The display according to claim 1, the thickness-adjusting layer and the light reflecting layer being disposed between the liquid crystal layer and the same one of the first and second substrates.

14. A liquid crystal display comprising:

a first substrate;

a second substrate;

a liquid crystal layer between the first substrate and the second substrate;

pixels regions that selectively and independently apply voltage to the liquid crystal layer, each pixel region including a reflective display region and a transmissive display region;

a light reflecting layer including the reflective display regions of the pixel regions;

a thickness-adjusting layer causing the thickness of the liquid crystal layer at the reflective display regions to be smaller than the thickness of the liquid crystal at the transmissive display regions;

color filters for reflective display formed in the reflective display regions;

color filters for transmissive display formed in the transmissive display regions; and a color filter overlap at a position between adjacent pixel regions.

15. The display according to claim 14, the thickness-adjusting layer including a slope corresponding to a border between the reflective display region and the transmissive display region of each pixel region, the color filters for reflective display and the color filters for transmissive display overlap at least at part of the slope of the thickness-adjusting layer between the reflective display regions and the transmissive display regions.

16. The display according to claim 14, the color filter overlap including a color filter for reflective display and a color filter for transmissive display.

17. The display according to claim 14, the color filter overlap including two color filters for transmissive display.

* * * * *